2,831,805

PHOTODECOMPOSITION OF COMPOUNDS CONTAINING A QUINONEIMINE OXIDE UNIT

Charles John Pedersen, Salem, N. J., assignor to E. I. du Pont de Nemours and Company, Wilmington, Del., a corporation of Delaware No Drawing. Application March 2, 1956
Serial No. 568,973

4 Claims. (Cl. 204—158)

The present invention is directed to a photolytic process for transforming an N,N'-disubstituted quinone diimine-N,N'-dioxide into azo compounds and N-substituted quinoneimine-N-oxides the latter in turn being photolytically converted into quinone and a second molecule of azo compound. The present process is also useful for destroying subject N-oxides when they are no longer needed as inhibitors of polymerization and oxidation reactions and for the generation in situ of "azo colors."

Usually the need for stabilizing a reactive substance is only temporary as in the manufacture, storage and shipment of polymerizable ethylenically unsaturated monomers such as styrene, methyl methacrylate and isoprene. When it is desired to polymerize the monomer under controlled conditions, it is first necessary to remove or deactivate the stabilizer. Stabilizers such as hydroquinone, phenyl naphthylamine, sulfur and copper and other well-known polymerization inhibitors are conventionally eliminated by one or more physical or chemical operations. These steps are costly and time-consuming.

It is an object of this invention to provide a simple and inexpensive method of inactivating the N,N'-disubstituted quinone diimine-N,N'-dioxides when they are no longer needed as polymerization inhibitors. These compounds are disclosed as inhibitors in U. S. Patent 2,681,918.

Another object of this invention is to generate azo compounds from said inhibitors.

More specifically, the claimed invention is directed to a process for transforming compounds containing the structural unit, $=C_6H_4=N(\rightarrow O)-$, into compounds containing the structural units, $=C_6H_4=O$ and $-N=N-$, by irradiating with light of a wavelength within the range of 3000 A. to 6000 A.

It has been discovered that when compounds of the structure

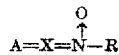

where A is $=N(\rightarrow O)R$ or oxygen and X is $=C_6H_4=$ or $=C_6H_4=C_6H_4=$, are exposed to actinic light of wavelengths $\lambda'$ and $\lambda''$, the following transformations occur (Equations 1 and 2):

(1) 

(2) 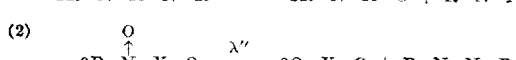

where the wavelength range $\lambda'$ is greater than the wavelength range $\lambda''$.

The starting compound for reaction 1 represents an N,N'-disubstituted-p-quinone diimine-N,N'-dioxide or the corresponding 4,4'-diphenoquinone diimine-N,N'-dioxide. Its initial decomposition products are the corresponding mono-N-oxide and azo compound. The monoxide in the above equations is an N-substituted-p-quinone imine-N-oxide or N-substituted-4,4'-diphenoquinone imine-N-oxide, and, as indicated, it further decomposes to a quinone, i. e., p-quinone (1,4-benzoquinone) or 4,4'-diphenoquinone, and an azo compound.

The substituent R in the compounds within the scope of the invention represents a radical of the aromatic, aliphatic and aliphatic-aromatic series. Typical aromatic radicals are phenyl, furyl, thienyl, naphthyl, benzofuryl and thianaphthyl, and such radicals containing halogen, alkyl, OH, $NH_2$, NH-alkyl, N-(alkyl)$_2$, O-alkyl, CN, $CONH_2$, CO-NH-alkyl, CON(alkyl)$_2$, COO-alkyl (where alkyl in the foregoing series means $C_1$–$C_4$), and $NO_2$ groups. In compounds $R-N(\rightarrow O)=X=N(\rightarrow O)-R$, where X is as previously defined, the R groups may be the same or different. Specific examples of such arrangements are N,N'-diphenyl, N,N'-bis(2-methyl-3-chlorophenyl), N,N'-bis(4-methoxyphenyl), N-phenyl-N'-(2-naphthyl). In addition R may be bromophenyl, chlorophenyl, nitrophenyl, ethylphenyl, dimethylphenyl, methylethylphenyl, n-butyl-phenyl, hydroxyphenyl, ethoxyphenyl, methylnaphthyl, methoxynaphthyl, chloronaphthyl, nitronaphthyl and the like including the corresponding radicals of the furan and thiophene series. Compounds in which the aromatic radicals are substituted with lower-alkyl and/or lower-alkoxyl groups containing up to about 4 carbon atoms are more readily available than the higher substituted members and are preferred for this reason. Similarly, for reasons of economy, chlorine is the preferred halogen substituent.

By "radicals of the aliphatic series" is meant alkyl, e. g., methyl, 2-butyl, t-amyl, octyl, 2-ethylhexyl and the like, or cycloalkyl, e. g., cyclopentyl, cyclohexyl, cycloheptyl, cyclooctyl, including lower-alkyl substituted cycloalkyl such as 1-methyl-cyclopentyl, 1-methylcyclohexyl, the corresponding position isomers, and the like. These alkyl and cycloalkyl radicals may also bear CN, $CONH_2$, CONH-alkyl, CON(alkyl)$_2$, CO—O-alkyl (where alkyl represents $C_1$–$C_4$ alkyl), COOH, and $NO_2$ groups. The carbo-containing group (i. e., CN, COOH, etc.) is preferably attached to the carbon of the alkyl or cyclo-alkyl radical which is bonded to nitrogen of the N-oxide group, e. g., 2-cyano-2-propyl radical. The $NO_2$ group, however, is preferably attached to the adjacent carbon atom as illustrated by the 1-nitro-2-methyl-2-propyl radical.

Substituent R may also represent an aliphatic-aromatic radical. Any of the above-defined aliphatic radicals may carry as a substituent any of the above-defined aromatic radicals. Such typical radicals are benzyl, 8-phenyloctyl, naphthylmethyl, furfuryl, 3-thienylpropyl, 2-(4-chlorophenyl)-2-propyl, and 1-(2-naphthyl)-1-cyanoethyl radicals. These aralkyl radicals are merely a sub-class of the aliphatic series.

Both R groups may be of the aliphatic series including the aralkyls, e. g., as in N,N'-bis(1-cyanocyclohexyl)-p-quinone-N,N'-dioxide, and may be the same or different aliphatic groups (including the aralkyls). Also, one R group may be from the aliphatic series (including the aralkyls) and the other from the aromatic series as in N-cyclohexyl, N'-phenyl-p-quinone diimine-N,N'-dioxide.

The process is independent of the nature of substituent R as long as R is an organic radical (including substituted organic radicals) of the aromatic, aliphatic, and aliphatic-aromatic series.

The N,N'-dioxides as a class are more sensitive than the mono-N-oxides, and the N-aryl group is more labile than the N-alkyl or N-aralkyl group. Therefore, the N,N'-dioxides constitute the preferred class and N,N'-diaryl-N,N'-dioxides the preferred compounds, particularly where R is phenyl, and most particularly N,N'-diphenyl-p-quinone diimine-N,N'-dioxide.

The subject compounds to which the conditions of the present process apply may be readily obtained by perof light. As a rule the greater the surface-to-volume ratio of the exposed solution, and the lower the concentration of the inhibitor present, and the more intense the light source, then the less is the time of exposure needed. If desired, the solution may be recirculated for repeated exposure until deactivation of inhibitor is complete. More than one light source may be conveniently applied.

The defined N-oxides may be utilized as precursors for the generation of "azo colors" by means of light. Here, at least one R group, and preferably both, are of the aromatic series, to produce an aromatic azo compound photochemically.

The following examples are given for purposes of illustration:

EXAMPLE 1

Four g. (0.0138 mol) of N,N'-diphenyl-p-quinone diimine-N,N'-dioxide in 800 cc. of benzene in a "Pyrex" flask were irradiated for 4 hours at room temperature with a mercury lamp equipped with a Corning Glass Co. filter (#3060) which removed all wavelengths below 3900A. The mercury lamp utilized is the Hanovia High Pressure Mercury Quartz Lamp Type A (466 watts) positioned approximately 8 inches from the reaction flask; said lamp was continuously cooled by blowing cold air over said lamp.

The photodecomposition products were separated by fractional crystallization from benzene and petroleum ether. Two and 9/10 g. were N-phenyl-p-quinone imine-N-oxide (0.0116 mol, 84.1% of theory based on reaction 1), identified by comparing its properties with those in the literature and those of an authentic sample.

|  | Recovered Product | Authentic Sample | Required by Theory |
| --- | --- | --- | --- |
| Physical form | Brown crystals. | Brown crystals. | Brown crystals.[1] |
| Melting point | 140° C | 141° C | 142° C.[1] |
| Molecular weight | 196 ± 7 |  | 199. |
| Percent Nitrogen | 7.03 | 6.98 | 7.04. |
| $\lambda$ Max. in MeOH | 3710 A | 3710 A |  |
| $\epsilon$ Max. in MeOH | 25,000 | 25,000 |  |

[1] Reported in Berichte 53B, 210 (1920).

The product was hydrogenated over a platinum catalyst in methanol to yield p-hydroxydiphenylamine, melting point alone and in admixture with an authentic specimen, 70° C.

One and 18/100 g. were azobenzene (0.0065 mol, 94.2% of theory based on reaction 1), identical to authentic azobenzene in physical form (orange crystals), melting point (68° C., alone and in admixture), nitrogen content (15.5% versus 15.8 for the authentic sample and 15.4 required by theory), $\lambda$ max. in EtOH (3170 A.) and $\epsilon$ max. in EtOH (23,000).

It will be noted that a filter was used to screen out wavelengths less than 3900 A. It will also be noted from the data presented above that the mono-N-oxide absorbs light at 3710 A. and that little or no decomposition of this compound occurred during 4 hours exposure. However, when the mercury lamp is equipped with a filter (Corning filter 3850) to remove substantially all wavelengths below 3700 A., and the mono-N-oxide in benzene is now exposed for about the same length of time about half decomposes. The products include azobenzene, N-phenyl-p-quinone imine (formed apparently by reduction) and quinone.

EXAMPLE 2

(a) One hundred cc. of a 0.0173 molar solution of N,N'-diphenyl-p-quinone diimine-N,N'-dioxide in benzene, i. e., having the concentration described in Example 1 above, was exposed to direct sunlight through a windowpane and through the walls of its "Pyrex" container. In this example the light entering the system was estimated to be of wavelengths within the range of at least 3000 to 3500 A. as a lower limit. The photodecomposition products were separated chromatographically on alumina and determined quantitatively in a spectrophotometer: p-quinone (0.00034 mol) was recovered along with N-phenyl-p-quinone imine-N-oxide (0.00086 mol) and azobenzene (0.00084 mol).

It will be noted that about half of the mono-N-phenyl-N-oxide (formed via reaction 1) had decomposed (via reaction 2) in direct sunlight in only 1 hour, whereas in Example 1 very little or none decomposed in 4 hours exposure in absence of light below 3900 A.

(b) When the above N,N'-diphenyl-N,N'-dioxide in ethyl alcohol (0.00058 mol/liter) is exposed to direct sunlight, the decomposition products now include hydroquinone in addition to N-phenyl-p-quinone imine-N-oxide and azobenzene. Evidently hydroquinone results from the photo-reduction of p-quinone by the alcohol. In contrast, benzene (above and in Example 1) does not act as a reducing agent under these conditions.

EXAMPLE 3

Two tenths g. (0.001 mol) of N-phenyl-p-quinone imine-N-oxide in 50 cc. benzene was exposed to direct sunlight in a fused quartz flask until the N-oxides were completely destroyed. The time required to effect the destruction of these N-oxides covered an 18-day period of exposure to sunlight as was available on each of the 18 days, at room temperature. The photo-decomposition products were separated on alumina using benzene, identified, and quantitatively determined as (1) azobenzene (0.000462 mol, 92.4% yield), (2) p-quinone (0.000052 mol, 5.2%) and (3) an unknown compound absorbing at 2180 A. in methanol. The photosensitivity of quinone itself explains the low recoveries of quinone after prolonged exposure and apparently also explains the formation of the unidentified compound.

EXAMPLE 4

N,N'-bis(4-methoxyphenyl)-p-quinone diimine - N,N'-dioxide (0.1207 g., 0.000345 mol) in benzene (60 cc.) was exposed in a "Pyrex" flask to direct sunlight for 6 days at room temperature to whatever sunlight was available during this 6-day period.

The main photodecomposition product, recovered on a chromatographic column and analyzed spectrophotometrically, was identified as 4,4'-dimethoxyazobenzene (0.0738 g., 0.000305 mol corresponding to 88.4% of theory based on Equations 1 and 2) on comparison of its properties with those in the literature and those of an authentic sample.

|  | Recovered Product | Authentic Sample | Required by Theory |
| --- | --- | --- | --- |
| Physical form | yellow crystals. | yellow crystals. | yellow crystals.[1] |
| Melting point | 161-2° C | 163-4° C | 165° C.[1] |
| $\lambda$ Max. in EtOH | 3550 A | 3550 A |  |
| $\epsilon$ Max. in EtOH | 25,000 | 25,000 |  |

[1] Reported in Berichte 40, 1422 (1907); others have given M. P. from 160 to 165° C.

EXAMPLE 5

Under identical conditions of exposure and work-up described in Example 4, N,N'-bis(2-methyl-3-chlorophenyl)-p-quinone diimine-N,N'-dioxide (0.1335 g., 0.000345 mol) yielded 2,2'-dimethyl-3,3'-dichloroazobenzene (0.0488 g., 0.000175 mol, approx. 50% of theory), identified in the usual way by comparing its properties with those reported (Monat. für Chem., 22, 490 (1901)) and with those of an authentic specimen: orange-red needles, M. P. 151-2° C.; $\lambda$ max. in EtOH 3300 A., $\epsilon$ max. 18,000.

EXAMPLE 6

A mixed N,N'-diaryl compound, N-(2-naphthyl)-N'-phenyl-p-quinone diimine-N,N'-dioxide (0.5 g. 0.00147 mol) in benzene (150 cc.) after 6 days exposure at room temperature to such sunlight as was available during this 6-day period of exposure, yielded the expected p-quinone and the three theoretically possible azo compounds: 0.00019 mol of azobenzene (M. P. 68° C.), 0.00034 mol of benzene-azo-2-naphthalene (M. P. 82° C.), and 0.00018 mol of azo-2-naphthalene (M. P. 206° C.). Approx. 36% of the photodecomposition products was lost in the chromatographic separation of the above mixture on alumina using petroleum ether and benzene as eluants. The recovered products were identified on comparison with authentic samples.

EXAMPLE 7

A mixture of N,N'-diphenyl-p-quinone diimine-N,N'-dioxide (0.213 g., 0.000735 mol) and N,N'-bis(4-methoxyphenyl)-p-quinone diimine-N,N'-dioxide (0.257 g., 0.000735 mol) in benzene (300 cc.) was exposed in a "Pyrex" flask to direct sunlight for 3 days under atmospheric temperature. The photodecomposition products were separated on alumina using petroleum ether, benzene and methanol. They were identified and quantitatively determined spectrophotometrically.

Three azo compounds were isolated: azobenzene (0.000334 mol, M. P. 68° C.), 4-methoxyazobenzene (0.000510 mol, M. P. 54° C.) and 4,4'-dimethoxyazobenzene (0.000255 mol, M. P. 165° C.), the relatively low recoveries is the result of considerable loss in separation of the mixture of three azo compounds into pure components.

EXAMPLE 8

$3 \times 10^{-5}$ molar solutions (0.00003 gram-mol per liter) in methanol of (1) N-cyclohexyl-N'-phenyl-p-quinone diimine-N,N'-dioxide and of (2) N,N'-dicyclohexyl-p-quinone diimine-N,N'-dioxide were separately exposed to direct sunlight at room temperature; said exposure was made to bright sunlight in the month of October. Changes in chemical composition were measured at intervals spectrophotometrically (see further for spectral constants). The instantaneous concentrations of the main components at the times indicated are given below:

1. *N-Cyclohexyl-N'-phenyl-N,N'-dioxide*

| Compound | Time in Minutes and Molar Concentration $\times 10^{-5}$ | | | | | |
|---|---|---|---|---|---|---|
| | 0 | ½ | 1 | 2 | 10 | 30 |
| Original | 3.0 | 1.6 | 0.32 | 0 | 0 | 0 |
| N-cyclohexyl-p-quinone imine-N-oxide | 0 | 1.4 | 2.68 | 2.7 | 1.7 | 1.0 |
| Azobenzene | 0 | 0.53 | 1.0 | 1.3 | 1.3 | 1.3 |

Equation 1 requires that the sum of the concentration of N,N'-dioxide and mono-N-oxide be equal to the original concentration of N,N'-dioxide if the process represented by Equation 2 is negligible, and that 0.5 mol of azo compound be formed along with each mol of mono-N-oxide. The data show that photodecomposition of N,N'-dioxide is virtually complete in 1 to 2 minutes, that the decomposition of the mono-N-oxide first becomes measurable thereafter and proceeds at a slower rate. The fact that the concentration of azobenzene reaches a maximum (coinciding with complete disappearance of N,N'-dioxide) and thereafter is constant (corresponding to about 87% conversion) shows that the N-phenyl group is preferentially eliminated to form the N-cyclohexyl-N-oxide derivative. Decomposition of this mono-N-oxide yields quinone and azocyclohexane (equation 2). Quinone, however, is photoreduced by methanol to hydroquinone and its concentration could not be determined with any certainty. Azocyclohexane could not be detected because it absorbs light very weakly compared to the above compounds within the wavelength region studied.

2. *N,N'-dicyclohexyl-N,N'-dioxide*

| Compound | Time in Minutes and Molar Concentration $\times 10^{-5}$ | | | | |
|---|---|---|---|---|---|
| | 0 | 2 | 10 | 18 | 30 |
| Original | 3.0 | 2.8 | 2.01 | 1.16 | 0.0 |
| N-cyclohexyl-p-quinone imine-N-oxide | 0 | 0.2 | 0.72 | 1.4 | 1.56 |

Again it is apparent that the N-cyclohexyl group is eliminated much less readily than N-phenyl (cf. 1, above), 18–30 minutes being required to completely photo-decompose the N,N'-dioxide to the same intermediate. It is also seen that the mono-N-oxide decomposes slowly, about ½ the theoretical quantity remains after 30 minutes exposure. For reasons given above, quinone and the other expected product, azocyclohexane, were not quantitatively determined.

*Spectral properties in methanol*

| | $\lambda$ Max., A. | $\epsilon$ Max. |
|---|---|---|
| N-cyclohexyl-N'-phenyl-p-quinone diimine-N,N'-dioxide | 4,100 | 48,000 |
| N,N'-dicyclohexyl-p-quinone diimine-N,N'-dioxide | 4,050 | 65,000 |
| N-cyclohexyl-p-quinone imine N-oxide | 3,770 | 26,000 |
| Azobenzene | 3,170 | 23,000 |

EXAMPLE 9.—PHOTODEACTIVATION OF INHIBITOR IN THE BULK POLYMERIZATION OF STYRENE

In this experiment all manipulation was in air and in dim light (except during irradiation of the styrene solutions). The desired concentrations of the inhibitors (see table) were obtained by diluting freshly prepared styrene stock solutions with styrene. The styrene was freshly distilled and refrigerated (0° C.) under nitrogen in a capped container until it was needed. The non-irradiated and irradiated samples were aliquots of equal volume from the same solution. The conditions of irradiated samples to deactivate the inhibitor and the conditions for polymerizing all samples were as follows:

*Irradiation.*—Five ml. (4.53 g.) of a styrene solution were placed in screw-cap colorless gass vials having a glass thickness of 1.2 mm., an internal diameter of 2.46 cm. and a capacity of 29 ml. The vial and its contents was irradiated at room temperature for 15 seconds at a distance of 16 cm. from a Sylvania RS Sunlamp (275 watts) which was permitted to warm up for 2 minutes before use.

*Thermal Polymerization.*—All samples that were irradiated and those non-irradiated contained in the above-described vials were held in a constant temperature oven at 80° C. in total darkness for 5 hours. No polymerization initiator was used. It was observed that under the conditions employed (1) irradiation of the control samples (no inhibitor present) has no effect on the quantity of polymer recovered; (2) between $5 \times 10^{-6}$ and $1 \times 10^{-5}$ mols per liter of inhibitor substantially inhibits polymerization of styrene, and irradiation of these solutions destroy much of the stabilizing effect as is evidenced by the following table.

TABLE

The polymer was isolated by pouring the heated styrene into 50 ml. of 95% ethyl alcohol, rinsing the vial with 10 ml. of benzene, and allowing to stand overnight at room temperature. The precipitated polymer was filtered through a tared asbestos-matted Gooch crucible, washed with 25 ml. of methanol, dried at 80° C. and weighed. The results obtained are given below.

| Stabilizer | Concn. of Stabilizer | | Grams of Polymer Recovered | | Recovered After irrad., 3 min. |
|---|---|---|---|---|---|
| | Wt. Percent | Moles/liter | Before irrad. | After irrad., 15 sec. | |
| None | | | 0.195 | 0.185 | |
| | | | 0.180 | 0.190 | |
| A | 0.00011 | 0.000005 | 0.060 | 0.145 | 0.170 |
| | 0.00022 | 0.00001 | 0.002 | 0.110 | |
| | 0.00044 | 0.00002 | 0.0 | 0.045 | |
| B | 0.000165 | 0.000005 | 0.003 | 0.155 | 0.165 |
| | 0.00033 | 0.00001 | 0.0 | 0.125 | |
| | 0.00066 | 0.00002 | 0.0 | 0.065 | |
| C | 0.00016 | 0.000005 | 0.035 | 0.140 | 0.180 |
| | 0.00032 | 0.00001 | 0.0 | 0.130 | |
| | 0.00064 | 0.00002 | 0.0 | 0.065 | |

In the above table, stabilizer "A" is the compound:

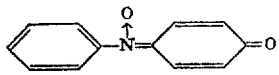

stabilizer "B" is the compound:

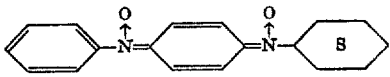

and stabilizer "C" is the compound:

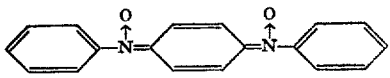

In lieu of styrene as the ethylenically unsaturated monomer dienes, in general, such as isoprene and chloroprene, ethylenic compounds, such as methyl methacrylate and vinyl acetate or mixtures of these and the like may be utilized.

Following deactivation, a polymerization initiator may be added in the conventional manner to effect the desired polymerization.

I claim:

1. A process for transforming a compound taken from the group consisting of an N,N'-disubstituted-p-quinone diimine-N,N'-dioxide and an N,N'-disubstituted 4,4'-diphenoquinone diimine-N,N'-dioxide into the corresponding quinone compound and an azo compound by irradiating with an actinic light rich in wavelengths within the range of 3000 A. to 6000 A.

2. The process of claim 1 wherein N,N'-diphenyl-p-quinone diimine-N,N'-dioxide is transformed into p-quinone and azobenzene.

3. A process for transforming a compound taken from the group consisting of an N,N'-disubstituted-p-quinone diimine-N,N'-dioxide and an N,N'-disubstituted 4,4'-diphenoquinone diimine-N,N'-dioxide into the corresponding quinone compound and an azo compound wherein said starting compound is (1) first irradiated with an actinic light having a wavelength between 3900 A. to 6000 A. to yield the corresponding mono-N-oxide and azo compound, followed by (2) additional irradiation with an actinic light having a wavelength between 3000 A. to 3900 A. to yield the corresponding quinone and additional azo compound.

4. A process for inactivating, as stabilizer in a polymerizable ethylenically unsaturated monomer, a compound taken from the group consisting of an N,N'-disubstituted-p-quinone diimine-N,N'-dioxide and an N,N'-disubstituted-4,4'-dipheno-quinone diimine-N,N'-dioxide by deactivating said stabilizer by irradiation with an actinic light rich in wavelengths within the range of 3000 A. to 6000 A.

References Cited in the file of this patent

UNITED STATES PATENTS 2,681,918    Pedersen _____ June 22, 1954